Dec. 12, 1961   L. MERKER   3,012,374

METHOD FOR GROWING CRYSTALS

Filed Oct. 15, 1957

INVENTOR
Leon Merker

BY
*H. L. Gammons*
AGENT 3,012,374
METHOD FOR GROWING CRYSTALS
Leon Merker, Bronx, N.Y., assignor to National Lead Company, New York, N.Y., a corporation of New Jersey
Filed Oct. 15, 1957, Ser. No. 690,304
4 Claims. (Cl. 49—77)

This invention relates in general to the production of synthetic crystals and more especially to a method for producing substantially strain-free and fracture-free boules by flame fusion.

The art of producing synthetic crystals by flame fusion began many years ago with the French inventor Verneuil who produced short carrot-shaped corundum crystals, referred to as boules, by fusing alumina in an oxygen-hydrogen flame.

A more recent development in this art is the flame fusion technique taught by Merker in U.S. Patent No. 2,684,910 in which he introduces powdered strontium titanate feed material into an oxygen-hydrogen flame at a temperature in the neighborhood of 2100° C. and crystallizes the melted material to form a monocrystalline carrot-shaped mass having a high index of refraction and hence especially suitable for use in optical systems.

Although monocrystalline masses of strontium, barium, calcium and similar titanates have been made successfully by the Merker process, it has been discovered that these monocrystalline masses, and notably calcium titanate and barium titanate, are subject to severe strain and fracturing upon completion of boule growth. This is attributed to the sudden drop in temperature which occurs immediately after the burner flame is shut off. Temperature drops of as much as 1100° C. in five minutes are common. Hence an inordinate amount of care and skill are required during production to insure strain-free crystals.

Some success in relieving badly strained crystals has been achieved by annealing the strained crystals in the manner described in the Merker Patent No. 2,777,255, January 15, 1957. While this treatment is quite satisfactory it does require considerable handling of the individual boules and much expenditure of time and fuel for reheating the boules. It is highly desirable, therefore, to eliminate or at least minimize annealing treatments by producing strain-free, single crystals from the burner flame.

An object of the instant invention is, therefore, to produce substantially strain-free monocrystalline masses by protecting the monocrystalline masses from thermal shock upon shutting off the burner flame.

Figure 1:
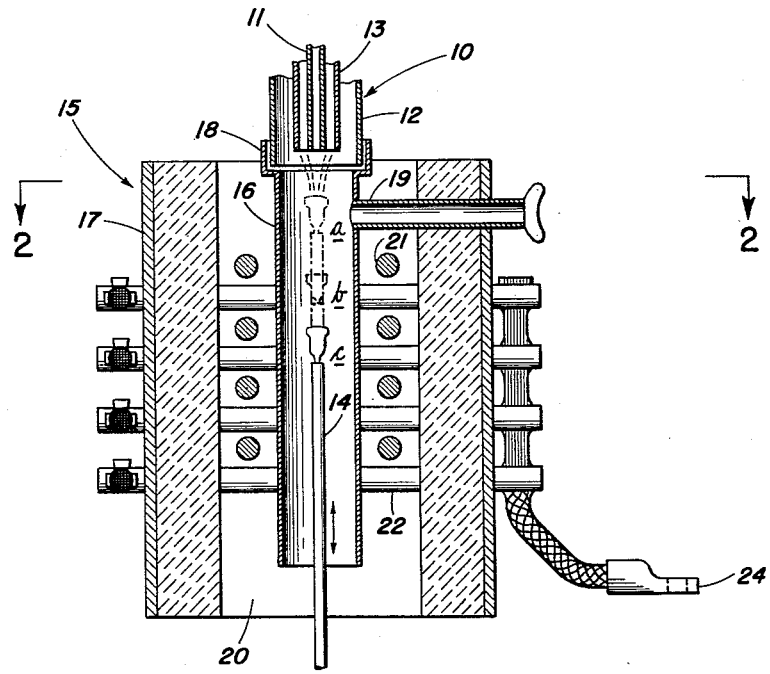
Figure 2:
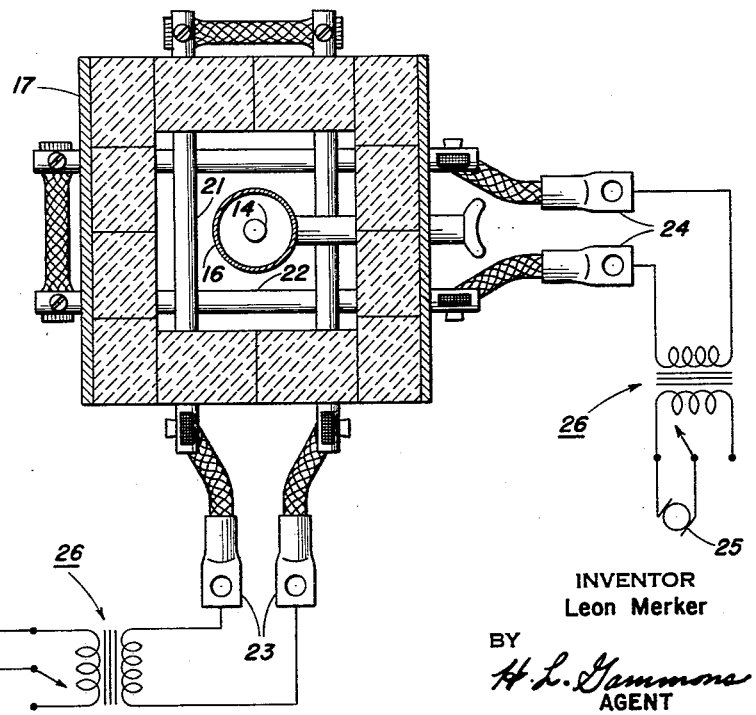

This and other objects, features and advantages of the invention will be discussed in greater detail in the description which follows, aided by the drawings in which:

FIG. 1 is a vertical elevation in section of the jacketed furnace of this invention, including a fragmentary schematic diagram of the burner, and FIG. 2 is a transverse view of the jacketed furnace on lines 2—2 of FIG. 1.

Referring to FIG. 1 of the drawings, the burner tip, which provides the oxygen-hydrogen flame and which feeds the boule feed material into the oxygen-hydrogen flame for fusion and formation of the boule is indicated schematically at 10 and comprises a central tube 11, an outer concentric jacket 12 and an intermediate concentric tube 13. In general, the boule feed material is fed to the oxygen-hydrogen flame in which the boule feed material is melted and deposited on a boule supporting pedestal or rod 14, hereinafter described, on which the boule grows upwardly in the form of a carrot-shaped single crystal.

An important requirement of the jacketed furnace of this invention is that in addition to providing means in which to grow monocrystalline masses it must be capable of keeping a newly-grown monocrystalline mass at high temperatures for extended periods of time after the burner flame is shut off; and also that it have means for bringing the temperature of the furnace up to these high temperatures in a relatively short period of time.

Referring to the drawings, the improved jacketed furnace 15 of this invention is characterized by the foregoing temperature control requirements and comprises two principal elements, namely, a furnace chamber 16 and a thermal jacket 17.

The furnace chamber 16 constitutes the unit within which: (1) fusion and crystallization of the feed material into the form of a boule takes place and (2) the just-formed boule is held captive during subsequent controlled cooling and/or heating. As shown, the chamber 16 comprises a substantially cylindrical tube formed of a fire resistant material, such as alumina, and provided at its upper end with a concentric enlargement 18 which is located adjacent the upper end of the thermal jacket 17. The chamber 16 is substantially in axial alignment with the burner tip 10 which is arranged to seat in the aforesaid enlargement 18 of the furnace chamber 16 as shown especially well in FIG. 1.

Located in one wall of the furnace chamber a short distance below its upper end is an aperture into which is fitted the inner end of a sight tube 19, also formed of alumina or the like. The sight tube is made long enough so that its outer end projects through and beyond the adjacent wall of the thermal jacket 17.

The sight tube provides means whereby the operator can observe visually the growth of the boule in the flame within the furnace chamber 16 and in this connection the pedestal 14 is made of a fire resistant material and serves as a support for the boule during its growth in a manner well known in the art. The pedestal 14 is substantially coaxial with the longitudinal axis of the chamber 16 and is supported at its lower end by screw threaded means or its equivalent (not shown) whereby the pedestal may be elevated and lowered within the furnace chamber 16 as indicated by the full lines and broken lines, respectively, in FIG. 1. When the pedestal 14 is in its uppermost position (a), it supports the boule being grown substantially opposite the sight tube 19. After growth of the boule has been terminated, the pedestal 14 is lowered to carry the boule downwardly into a region (c) of high heat concentration in the chamber 16 where it is subsequently cooled without suffering thermal shock, as hereinafter described.

In its broadest aspects, the invention contemplates accurately controlling the temperature within the furnace chamber 16 throughout long periods of time after the boule flame has been extinguished and in particular in that region of the chamber in which the heat developed within the chamber, by the hereinafter described heating elements, will be maximum. By referring to FIG. 1 it will be seen that this region (c) of the chamber corresponds to a point in the chamber about midway, vertically, of the heating elements 21 and 22 and is below the sight tube 19. It is in this region of high heat concentration that a newly formed boule is held captive while its temperature is slowly lowered to protect the boule from thermal shock and also where the boule may be annealed in situ.

The means by which the temperature in the furnace chamber 16 may be accurately controlled after the boule forming flame has been shut off comprises the thermal jacket 17, and its heating elements 21 and 22. The thermal jacket 17 comprises a sleeve-like member formed of a refractory material such as fire brick or the like enclosed by insulation sheeting and characterized by a central aperture 20 adapted to accommodate the furnace chamber 16. To this end the central aperture 20 of the thermal jacket has cross sectional dimensions such as to provide sufficient clearance between the walls of the furnace chamber 16 and the adjacent walls of the thermal jacket to accommodate the heating elements 21 and 22. In the particular embodiment shown, the thermal jacket as well as its central aperture are substantially square in cross section and the transverse dimension of the central aperture 20 is about 3 times the diameter of the furnace chamber 16. It will be understood, however, that the dimensions and cross-sectional shape of the thermal jacket and its central aperture are not critical to its operativeness and that the dimensions of both or either may vary as well as the cross-sectional shapes. It is desirable, however, that there be substantially equal spacing surrounding the walls of the chamber 16 and the adjacent walls of the thermal jacket to insure uniform heat control.

Various types of heating elements may be used to heat the furnace chamber 16, and one particularly practical and highly efficient means comprises a plurality of silicon carbide resistance heating elements 21 and 22, sometimes referred to hereinafter as heating elements or globars, arranged to extend into the clearance space between the furnace chamber 16 and the adjacent walls of the thermal jacket and to effectively surround the chamber 16. As an illustrative arrangement two sets of heating elements may be used as indicated at 21 and 22, respectively, the one set comprising eight globar elements 21 arranged in pairs of vertically spaced tetrads extending transversely through opposite walls of the thermal jacket in spaced substantially parallel relationship and with the vertically spaced tetrads of heating elements arranged on opposite sides respectively of the furnace chamber; and the second set of eight globar elements 22 similarly arranged on the opposite side of the furnace chamber, the heating elements 21 of the one set being crossed over the heating elements 22 of the second set as indicated clearly in FIGS. 1 and 2. Each set of heating elements is provided with its own pair of terminals 23—23 and 24—24 by which the heating elements are connected to power sources 25. With this arrangement a region of high heat concentration may be provided within the chamber 16 the temperature of which may be nicely controlled by means of magnetic core transformers or similar current control means as indicated at 26. For simplicity of illustration each set of heating elements 21 and 22 respectively is shown with a transformer but it will be understood that a circuit may be used employing but one transformer.

Although the use of the globar-type heating elements has been wholly satisfactory, other types of heating elements may be used, as for example a platinum wire winding around the furnace chamber 16. However, as pointed out above, the important requirement of the heating element, whatever it may be, is that it be capable of preventing severe temperature drops in a newly-grown boule after the burner flame is shut off; as well as to bring up the temperature of the region of high heat concentration in the chamber 16 at a relatively rapid rate. Not all heating means are capable of the required rapid heat increase, but globars arranged in the manner shown and described are capable of developing temperatures as high as 1600° C. in the region of high heat concentration; and to achieve this temperature in from 10 to 20 minutes.

From the description thus far it will be seen that the furnace chamber 16 may be considered as comprising a region (a) of boule growth or fusion and a region (c) of high heat concentration the former being at a point substantially opposite the peep sight 19 and the latter that portion of the furnace chamber which is centrally located with respect to the eight pairs of globars.

It has been discovered however that in order to effectively protect a newly formed boule from severe thermal shock the boule should not be lowered immediately from the region (a) of fusion to the region (c) of high heat concentration; but that the boule must first be lowered into a position intermediate the regions (a) and (c) in which intermediate position the temperature of the boule is momentarily maintained substantially unchanged from that temperature which prevails during fusion in region (a) of the chamber. While it is extremely difficult to assign a specific temperature to a boule during fusion, it is a fact that there is a temperature gradient of from 200 to 300° C. between the crystallized boule base and the upper end of the boule which is at substantially burner flame temperatures. However, irrespective of what specific temperature might be assigned to the boule the intermediate position (b) to which the boule is lowered while the burner flame is still on is one where the temperature is maintained sufficiently high both by heat supplied by the burner flame and by the heating elements immediately adjacent this region of the chamber 16 so as to preclude any substantial change in the temperature which prevailed in the boule during growth.

Before describing the operation of the improved jacketed furnace of this invention, it will be explained briefly that a monocrystalline mass in the form of a boule is produced by first placing (or forming) a seed crystal on the upper end of the boule supporting pedestal 14, which is initially in the boule growth region (a) of the chamber 16, and then feeding the feed material into the burner flame thereby fusing the feed material on the seed crystal and gradually building up the amount of fused feed material thereon to form a boule of the desired size. This procedure allows the crystal to build up upon itself gradually increasing in diameter until the carrot-shaped single crystal is formed.

The feed material is a finely divided relatively pure free-flowing powder of uniform particle size and is fed at a predetermined rate through the central feed tube 11 onto the upper end of the raised pedestal 14 where it is fused into the form of a monocrystalline mass by the high temperature flame produced by ignition of the streams of air, hydrogen and oxygen emitted from the burner tubes.

During growth of the monocrystalline mass on the pedestal, the temperature of the burner flame is maintained at a predetermined level which varies depending upon the type of feed material being fused. Burner flame temperatures for producing a barium titanate boule are in the range of from 1575° C. to 1675° C. For the production of calcium titanate monocrystalline masses, burner flame temperatures are in the range of from 1900° C. to 2000° C. while burner flame temperatures in the range of from 2000° C. to 2100° C. are employed in the production of strontium titanate boules.

Turning now to the operation of the improved furnace of this invention, as the feed material is being fed to the burner flame and growth of the monocrystalline mass begins the globars 21 and 22 of the furnace are energized to heat the chamber 16 to an elevated temperature, as for example, from 1000° C. to 1500° C. depending upon the temperature of the burner flame being used.

Upon completion of the boule growth and before the burner flame has been shut off, the boule supporting pedestal 14 is lowered from the region of boule growth (a), see FIG. 1, to its intermediate position (b) which is substantially midway of the region of boule growth (a) and the region of high heat concentration (c) FIG. 1. Simultaneously with the lowering of the boule into intermediate position (b) the heating elements of the chamber 16 are further energized to raise the temperature of the chamber 16 rapidly to a point such that the heat will preclude any substantial change in the temperature of the boule. With the thermal jacket and heating element assembly of this invention the requisite temperature may be reached in one or two minutes. Thereupon the burner flame is extinguished and the boule lowered into the region (c) of the chamber as indicated by the full lines in FIG. 1.

Thus, from the time the burner flame is shut off and the boule lowered from its intermediate position (b) to the region (c) within the chamber 16 the temperature of the boule has been positively maintained, with insignificant drop from the temperature conditions which prevailed in the boule during fusion. As a consequence the newly grown boule is not subjected to thermal shock and will therefore be free of strains and incipient fractures.

From this point on the temperature of the boule may be accurately controlled by regulating the magnetic core transformers 26 that control the temperature in the region (c) of heat concentration within the chamber 16. Thus, where experience has shown that a prolonged annealing treatment is not necessary, the temperature of the boule may be gradually lowered to room temperature at a predetermined rate which will preclude thermal shock. Or where experience has shown that an annealing treatment is beneficial the temperature of the boule may be held constant at a predetermined level and for a predetermined length of time; and thereafter, cooled at a relatively slow rate to room temperature. This subsequent heat treatment constitutes in effect an annealing treatment in situ followed by cooling and while it has been found that boules formed and heat treated in the furnace of this invention are substantially strain-free this subsequent annealing treatment in situ will remove any incipient strain that may exist in the crystal.

The following examples illustrate specific applications of the furnace in producing various types of strain-free crystals.

*Example I*

Using the improved furnace hereinabove described a barium titanate boule was formed by feeding barium titanate feed material to the burner flame, the temperature of which was 1650° C. The feed material fused in the burner flame and was deposited on and grew upwardly from the pedestal 14 as a single crystal boule, the growth of the boule occuring in region (a) of the furnace chamber 16. During boule growth the temperature of the furnace chamber at (a) was about 1450° C.

Upon completion of boule growth the feed was shut off and the boule was lowered into position (b) of the chamber while maintaining the burner flame on. Simultaneously the heating elements were further energized to raise the temperature within the chamber 16 rapidly. The temperature within the chamber 16 at position (b), measured at the boule surface and therefore, for all practical purposes the temperature of the boule, was 1280° C. which was sufficiently high to preclude any thermal shock to the boule in moving from its position of fusion (a) to its position (b) in the chamber 16. The boule was held at position (b) for three minutes during which time the temperature of the boule at (b) was increased to 1390° C. by heat from the heating elements. The burner flame was then shut off. One minute after shutting off the flame the temperature of the boule at (b) had dropped to 1350° C. but within three minutes the temperature at (b) was up to 1420° C. The maximum temperature drop of the boule at (b) immediately following burner flame shut off was thus only 40° C. and at no time did the temperature fall below 1280° C.

Heating was continued thereafter until the temperature of the boule at (b) was 1460° C. at which temperature the boule was held for 10 hours. Thereafter the boule was cooled at the rate of 50°/hr. to 400° C. The boule was then removed from the pedestal and tested under crossed Nicol prisms for strain patterns. The boule showed substantially no color pattern indicative of internal strain.

*Example II*

A second barium titanate boule was made as in the preceeding run except that the furnace temperature at (a) was about 1400° C. At feed shut off the temperature measured at the boule surface in position (b) within the furnace 16 was 1170° C. which was sufficiently high to preclude any harmful thermal shock to the boule. The boule was held at (b) for 4 minutes during which time the temperature at (b) was increased to 1380° C. by heat from the heating elements. The burner flame was then shut off. Within two minutes from burner flame shut off the temperature at (b) dropped to 1370° C. but within 6 minutes was up to 1440° C. After 10 minutes the temperature of the boule at (b) was up to 1480° C. The maximum temperature drop of the boule immediately following burner flame shut off was thus only 10° C. and at no time did the temperature fall below 1170° C.

The boule was kept at 1480° C. for four hours then cooled to 400° C. at the rate of 50°/hr. The boule showed only traces of strain when examined under crossed Nicol prisms.

*Example III*

A further run was made as in the preceding examples but in this run calcium titanate was used as the feed material. The temperature of the burner flame during boule growth was in the neighborhood of 1900° C. to 2000° C. The temperature of the boule was thus considerably higher than in the case of barium titanate and as a consequence the significant temperature against which to measure temperature drop upon shutting off the burner flame was the furnace temperature at (b) immediately prior to burner flame shut off. In this run the furnace temperature at (b) was 1410° C. and within 3 minutes after burner flame shut off the temperature at (c) was 1380° C. Within 5 minutes the temperature was back up to 1450° C. The maximum temperature drop following burner flame shut off was thus only 30° C.

The boule was held at 1480° C. for 11 hours and then cooled to room temperature at the rate of 75° C./hr. The boule was substantially free of strain and incipient fractures.

*Example IV*

A second calcium titanate boule was made using the procedure described in Example III. In this instance the temperature at (b) at burner flame shut off was 1490° C. Within one minute from the time the burner flame was shut off the temperature at (c) was 1460° C. a drop of 30° C. Within two minutes the temperature at (c) had risen to 1510° C. The boule was held in the furnace chamber at a temperature of 1560° C. for 10 hours and then cooled at the rate of 30° C./hr. to room temperature. The boule was tested and found to be substantially free of strain and of good color.

*Example V*

The following run was made for comparative purposes to show the temperature drop experienced by a boule produced without benefit of the improved furnace of this invention. The feed material was barium titanate and the temperature of the burner flame 1600° C. At feed shut off the temperature of the boule was approximately 1300° C. Immediately thereafter the boule flame was shut off and the temperature of the boule dropped to 900° C. in one minute. Within 9 minutes the temperature of the boule had dropped to 320° C.

Thus the temperature of the boule dropped 400° C. in one minute from flame shut off and approximately 980° C. within 10 minutes. When examined for thermal strain the boule was found to be highly strained due to severe thermal shock.

From the foregoing description and examples, it is clear that the invention provides a method for producing monocrystalline masses of barium titanate, calcium titanate, strontium titanate and the like which are substantially free of internal strain and incipient fractures and hence, may be faceted with a minimum loss of crystal and consequent economy of production. Moreover, the improved furnace greatly minimizes the degree of care and skill as well as the time required in the production of strain-free crystals.

I claim:

1. A method for producing a substantially strain-free monocrystalline mass by flame fusion comprising the steps of: feeding a powdered feed material to a burner flame, fusing said feed material in said burner flame to form a monocrystalline mass, adding supplementary heat to all portions of said monocrystalline mass simultaneously prior to shutting off said burner flame to maintain the temperature of said mass substantially unchanged upon shutting off said burner flame and to distribute heat uniformally throughout said mass prior to shutting off said burner flame, and then shutting off said burner flame.

2. A method for producing a substantially strain-free monocrystalline mass by flame fusion comprising the steps of: feeding a powdered feed material to a burner flame, fusing said feed material in said burner flame to form a monocrystalline mass, adding supplementary heat to all portions of said monocrystalline mass simultaneously prior to shutting off said burner flame to maintain the temperature of said mass substantially unchanged upon shutting off said burner flame and to distribute heat uniformally throughout said mass prior to shutting off said burner flame, and then shutting off said burner flame and cooling said monocrystalline mass uniformly by reducing said supplementary heating.

3. A method for producing a substantially strain-free monocrystalline mass by flame fusion comprising the steps of: feeding a powdered feed material to a burner flame, fusing said feed material in said burner flame to form a monocrystalline mass, shutting off said feed material, withdrawing said monocrystalline mass from said burner flame, while simultaneously adding supplementary heat to all portions of said monocrystalline mass simultaneously prior to shutting off said burner flame to maintain the temperature of said mass substantially unchanged upon shutting off said burner flame and to distribute heat uniformally throughout said mass prior to shutting off said burner flame, and then shutting off said burner flame 4. A method for producing a substantially strain-free monocrystalline mass by flame fusion comprising the steps of: feeding a powdered feed material to a burner flame, fusing said feed material in said burner flame to form a monocrystalline mass, shutting off said feed material, withdrawing said monocrystalline mass from said burner flame, while simultaneously adding supplementary heat to all portions of said monocrystalline mass simultaneously prior to shutting off said burner flame to maintain the temperature of said mass substantially unchanged upon shutting off said burner flame and to distribute heat uniformally throughout said mass prior to shutting off said burner flame, and then shutting off said burner flame and cooling said monocrystalline mass uniformally by reducing said supplementary heating at a rate to preclude strains in said monocrystalline mass.

References Cited in the file of this patent

UNITED STATES PATENTS

| 1,605,073 | Ruff | Nov. 2, 1926 |
| 1,793,672 | Bridgman | Feb. 24, 1931 |
| 2,591,561 | Lester et al. | Apr. 1, 1952 |
| 2,723,916 | Lynd et al. | Nov. 15, 1955 |

FOREIGN PATENTS

| 167,408 | Australia | Apr. 9, 1956 |